United States Patent
Gupta et al.

(10) Patent No.: US 12,526,645 B2
(45) Date of Patent: Jan. 13, 2026

(54) SYSTEM AND METHOD FOR COMPUTING USER CORRELATED NETWORK SCORE IN A TELECOM AREA

(71) Applicant: Jio Platforms Limited, Gujarat (IN)

(72) Inventors: Ajay Kumar Gupta, Maharashtra (IN); Niraj Kumar Verma, Maharashtra (IN); Vikram Singh, Maharashtra (IN); Aayush Bhatnagar, Maharashtra (IN); Rajeev Gupta, Maharashtra (IN)

(73) Assignee: jIO PLATFORMS LIMITED, Ahmedabad (IN)

( * ) Notice: Subject to any disclaimer, the term of this patent is extended or adjusted under 35 U.S.C. 154(b) by 490 days.

(21) Appl. No.: 17/854,475

(22) Filed: Jun. 30, 2022

(65) Prior Publication Data

US 2023/0007500 A1    Jan. 5, 2023

(30) Foreign Application Priority Data

Jun. 30, 2021 (IN) .............................. 202121029445

(51) Int. Cl.
*H04W 16/18* (2009.01)
*H04L 41/147* (2022.01)

(52) U.S. Cl.
CPC ........... *H04W 16/18* (2013.01); *H04L 41/147* (2013.01)

(58) Field of Classification Search
CPC ..... H04W 16/18; H04W 16/32; H04W 16/22; H04L 41/147
USPC ....................................................... 370/329
See application file for complete search history.

(56) References Cited

U.S. PATENT DOCUMENTS

| | | | |
|---|---|---|---|
| 9,652,972 B1* | 5/2017 | Lobo | H04L 41/0618 |
| 2012/0016823 A1* | 1/2012 | Paillet | G06F 18/214 |
| | | | 706/12 |
| 2013/0201943 A1* | 8/2013 | De Domenico | H04W 28/0268 |
| | | | 370/329 |
| 2014/0120930 A1* | 5/2014 | Harris | H04L 41/5009 |
| | | | 455/422.1 |
| 2015/0173011 A1* | 6/2015 | Das | H04W 16/02 |
| | | | 370/328 |
| 2015/0173051 A1* | 6/2015 | Nagata | H04W 24/08 |
| | | | 370/329 |
| 2015/0282036 A1* | 10/2015 | Yi | H04L 5/0048 |
| | | | 370/332 |

(Continued)

*Primary Examiner* — Thuong Nguyen
(74) *Attorney, Agent, or Firm* — FINNEGAN, HENDERSON, FARABOW, GARRETT & DUNNER, LLP

(57) ABSTRACT

Low-performing cells, serving a telecom deployment in a given geographical area, are commonly identified by the telecom operators based on one or more Network KPIs computed for each of the cells being part of the deployment. However, most of these KPIs describe the overall state of affairs of the cell without any insight into the user usage profile of the cell. The present disclosure proposes a novel method to adjust the network KPIs based on scores of the macro cell or the small cell (101) with the user usage profile of the cell to obtain the user correlated network scores of the cells and prioritize the low-performing cells in the network in order of degree of impact on users and their usage. Another aspect of this disclosure is that it shall predict and compute a realistic user score to get predictive insights into user profiles for solutions and preventive measures.

18 Claims, 4 Drawing Sheets

(56) References Cited

U.S. PATENT DOCUMENTS

| | | | |
|---|---|---|---|
| 2015/0319723 A1* | 11/2015 | Korhonen | H04J 3/0679 |
| | | | 370/350 |
| 2016/0037579 A1* | 2/2016 | Jung | H04W 24/08 |
| | | | 370/252 |
| 2016/0095029 A1* | 3/2016 | Dalsgaard | H04W 48/20 |
| | | | 370/331 |
| 2017/0061005 A1* | 3/2017 | Purcell | H04L 67/306 |
| 2019/0043068 A1* | 2/2019 | Livne | G06Q 30/0205 |
| 2019/0355015 A1* | 11/2019 | Dashevskiy | G06Q 30/0242 |
| 2019/0373487 A1* | 12/2019 | Harrow | H04W 24/02 |
| 2022/0240123 A1* | 7/2022 | Zeng | H04W 28/0983 |
| 2023/0012980 A1* | 1/2023 | He | H04W 36/302 |

* cited by examiner

SYSTEM AND METHOD FOR COMPUTING USER CORRELATED NETWORK SCORE IN A TELECOM AREA

TECHNICAL FIELD

The present disclosure relates to telecommunication, and more particularly to identifying LTE network cells for computing a User Correlated Network Score (CNS) of a telecom area being part of an existing telecom deployment in a heterogeneous telecom network and is intended to be used for KPI improvement score to improve the experience in a telecom network.

BACKGROUND

The following description of related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of prior art.

Today with the advent of wireless technology like Global System for Mobile Communication (GSM), Enhanced Data Rates for GSM Evolution (EDGE), High Speed Packet Access (HSPA), Long Term Evolution (LTE), and the like, all communications in a wireless network provide various communication services such as voice, video, data, advertisement, content, messaging, broadcasts, etc. One example of such a network is Evolved Universal Terrestrial Radio Access (E-UTRA). E-UTRA is a radio access network standard that is meant to be a replacement for Universal Mobile Telecommunications System (UMTS) and High-Speed Downlink Packet Access (HSDPA)/High-Speed Uplink Packet Access (HSUPA) technologies as specified in 3rd Generation Partnership Project (3GPP) releases 5 and beyond. E-UTRA is an air interface of 3GPP's LTE upgrade path for mobile networks. Unlike HSPA, E-UTRA of LTE is an entirely new air interface system, unrelated to and incompatible with W-CDMA. It provides higher data rates, and lower latency, and is optimized for packet data. The UMTS, which is a successor to GSM technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced third-generation (3G) data communications protocols, such as HSPA, which provides higher data transfer speeds and capacity to associated UMTS networks. With the capacity and higher data transfer speeds, there are many problems associated with the cells and the optimization of the cells.

In 5G cellular deployment, macro cells, along with various small cells, are planned to provide a coverage and capacity solution across a target area. Thus, inter-site distance becomes narrower for the network. Further, a greater number of sites/eNodeBs are required to mitigate ongoing data demand in the emerging network, which creates a dense to hyper-dense radio access network in big cities.

Key Performance Indications (KPIs) are being used in the method for calculating throughput, call drop rate, and mute call rate. The network events generated by the users constitute already known information. KPI information is generally universal and is calculated from the counters/events, which are specific to a network element of a telecom vendor.

In the present day, Telecom Operators & Vendors in Telecom Industry run the Network performance improvement plans based on the network KPIs. The network KPIs are calculated through the counters/events measured by the network elements and these plans don't have any counters that provide a measurement of customer's experience. Though these plans provide the cells that are needed for overall network improvement, yet, they fail to identify the cells that are impacting the users most.

Currently, existing approaches of KPIs computations, in the telecom network, are based on computing the counters measured by the network elements and don't have any counters that provides measurement of customer's experience. However, the approach is incapable of computing a realistic user score of an arbitrary geographical area. This is due to the fact that the area could potentially be served by multiple telecom cells. Further, the spatial density of users may vary vastly across different regions of the area.

There is therefore a need in the art to provide a method and system that can overcome the shortcomings of the existing prior art.

OBJECTS OF THE PRESENT DISCLOSURE

Some of the objects of the present disclosure, which at least one embodiment herein satisfy are as listed herein below.

An object of the present disclosure is to provide a method and a system for computing user correlated network score of mobile users across a telecom network.

An object of the present disclosure is to provide a method and a system for enhancing communication experience for mobile users across a telecom network.

An object of the present disclosure is to provide a method and a system for computing user correlated network score of mobile users across a telecom network of an arbitrary geographical region served by different Telecom Operators & Vendors of the Telecom Industry.

An object of the present disclosure is to provide a method and a system for assessing a mobile customer's communication experience in the telecom network by scoring each network cell by correlating KPIs based on network and users both, derived from the counters of network elements, as well as the counters of network events generated by customers.

An object of the present disclosure is to provide a method and a system for computation of a realistic User Correlated Network Scores to get insights into user profile of the telecom area.

An object of the present disclosure is to provide a method and a system to identify only the cells needed for overall network performance improvement in the telecom area.

An object of the present disclosure is to provide a method and a system to identify the cells that are impacting the user experience the most in the telecom area.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for computing a user correlated network score in a telecom area. The system computes a network score based on one or more Key Performance Indications (KPIs) of a macro cell or a small cell operating in the telecom area for a time interval T.

The network score of the macro cell or the small cell (101) operating in the telecom area for the time interval T is computed based on the KPIs that comprise an average throughput, a Physical Resource Block (PRB) utilization, interference ratio, a call drop rate, a mute call rate, and a call setup success rate. Further, the system selects a group of mobile users based on the computed network score. The selected group of mobile users have the network score of a last "n" percentile network score. Further, the system collects a call record of the selected group of mobile users from a storage module. The call record of the selected group of mobile users from the storage module is captured when a mobile user initiates a voice or a data session with the telecom network by latching on to the macro cell or the small cell operating in the telecom area. Further, the call record of the selected group of mobile users from the storage module comprises parameters such as a user IMSI identifier, a usage duration, a cell identifier, and a voice/data flag.

Further, the system aggregates a session duration across the collected call record to compute a total user call duration for the macro cell or the small cell operating in the telecom area for the time interval T. Further, the system computes a number of unique mobile users latched on the macro cell or the small cell operating in the telecom area by aggregating the collected call record cell-wise. Further, the system computes a user correlation factor of the macro cell or the small cell operating in the telecom area for the time interval T based on the total user call duration for the macro cell or the small cell (101) operating in the telecom area for the time interval T and the number of unique mobile users (102) latched on the macro cell or the small cell (101) operating in the telecom area. The user correlation factor of the macro or small cell operating in the telecom area for the time interval T is stored in the storage module. Further, the user correlation factor of the macro cell or the small cell operating in the telecom area for the time interval T is calculated by dividing the total user call duration computed for the macro cell or the small cell by the time interval T scaled with the number of unique mobile users latched on the macro cell or the small cell operating in the telecom area. Thereafter, the system computes a user correlated network score for the macro cell or the small cell operating in the telecom area based on the computed network score and the computed user correlation factor of the macro cell or the small cell (101) operating in the telecom area for the time interval T. The user correlated network score is calculated by scaling the computed network score with the computed user correlation factor of the macro cell or the small cell operating in the telecom area for the time interval T. Further, the user correlated network score comprises a realistic user score that provides a predictive insight into a mobile user profile of the telecom area. Further, the user correlated network score for a bigger time interval $T_{Large}$ is calculated by dividing a bigger time interval $T_{Large}$ into a plurality of smaller and equal time intervals $T_{Small}$ and computing the user correlated network score for a plurality of smaller and equal time intervals $T_{Small}$ and averaging the computed correlated network scores for a plurality of smaller and equal time intervals $T_{Small}$ to compute the user correlated network score for a bigger time interval $T_{Large}$.

In an aspect, the present disclosure provides a method for computing a user correlated network score in a telecom area. The method includes computing, by a processor, a network score based on one or more Key Performance Indications (KPIs) of a macro cell or a small cell operating in the telecom area for a time interval T. The network score of the macro cell or the small cell operating in the telecom area for the time interval T is computed based on the KPIs that comprise an average throughput, a Physical Resource Block (PRB) utilization, interference ratio, a call drop rate, a mute call rate, and a call setup success rate. Further, the method includes selecting, by the processor, a group of mobile users based on the computed network score. The selected group of mobile users have the network score of a last "n" percentile network score. Further, the method includes collecting, by the processor, a call record of the selected group of mobile users from a storage module. The call record of the selected group of mobile users from the storage module is captured when a mobile user initiates a voice or a data session with the telecom network by latching on to the macro cell or the small cell operating in the telecom area. The call record of the selected group of mobile users from the storage module comprises parameters such as a user IMSI identifier, a usage duration, a cell identifier, and a voice/data flag. Further, the method includes aggregating, by the processor, a session duration across the collected call record to computing, by the processor, a total user call duration for the macro cell or the small cell operating in the telecom area for the time interval T.

Further, the method includes computing, by the processor, a number of unique mobile users latched on the macro cell or the small cell operating in the telecom area by aggregating the collected call record cell-wise. Further, the method includes computing, by the processor, a user correlation factor of the macro cell or the small cell operating in the telecom area for the time interval T based on the total user call duration for the macro cell or the small cell operating in the telecom area for the time interval T and the number of unique mobile users latched on the macro cell or the small cell operating in the telecom area. The user correlation factor of the macro or small cell operating in the telecom area for the time interval T is stored in the storage module. The user correlation factor of the macro cell or the small cell operating in the telecom area for the time interval T is calculated by dividing the total user call duration computed for the macro cell or the small cell by the time interval T scaled with the number of unique mobile users latched on the macro cell or the small cell operating in the telecom area. Furthermore, the method includes computing, by the processor, a user correlated network score for the macro cell or the small cell operating in the telecom area based on the computed network score and the computed user correlation factor of the macro cell or the small cell (101) operating in the telecom area for the time interval T. The user correlated network score is calculated by scaling the computed network score with the computed user correlation factor of the macro cell or the small cell (101) operating in the telecom area for the time interval T. The user correlated network score comprises a realistic user score that provides a predictive insight into a mobile user (102) profile of the telecom area. Further, the user correlated network score comprises a realistic user score that provides a predictive insight into a mobile user profile of the telecom area. Further, the user correlated network score for a bigger time interval $T_{Large}$ is calculated by dividing a bigger time interval $T_{Large}$ into a plurality of smaller and equal time intervals $T_{Small}$ and computing the user correlated network score for a plurality of smaller and equal time intervals $T_{Small}$ and averaging the computed correlated network scores for a plurality of smaller and equal time intervals $T_{Small}$ to compute the user correlated network score for a bigger time interval $T_{Large}$.

BRIEF DESCRIPTION OF THE DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components.

DETAILED DESCRIPTION

Figure 1:
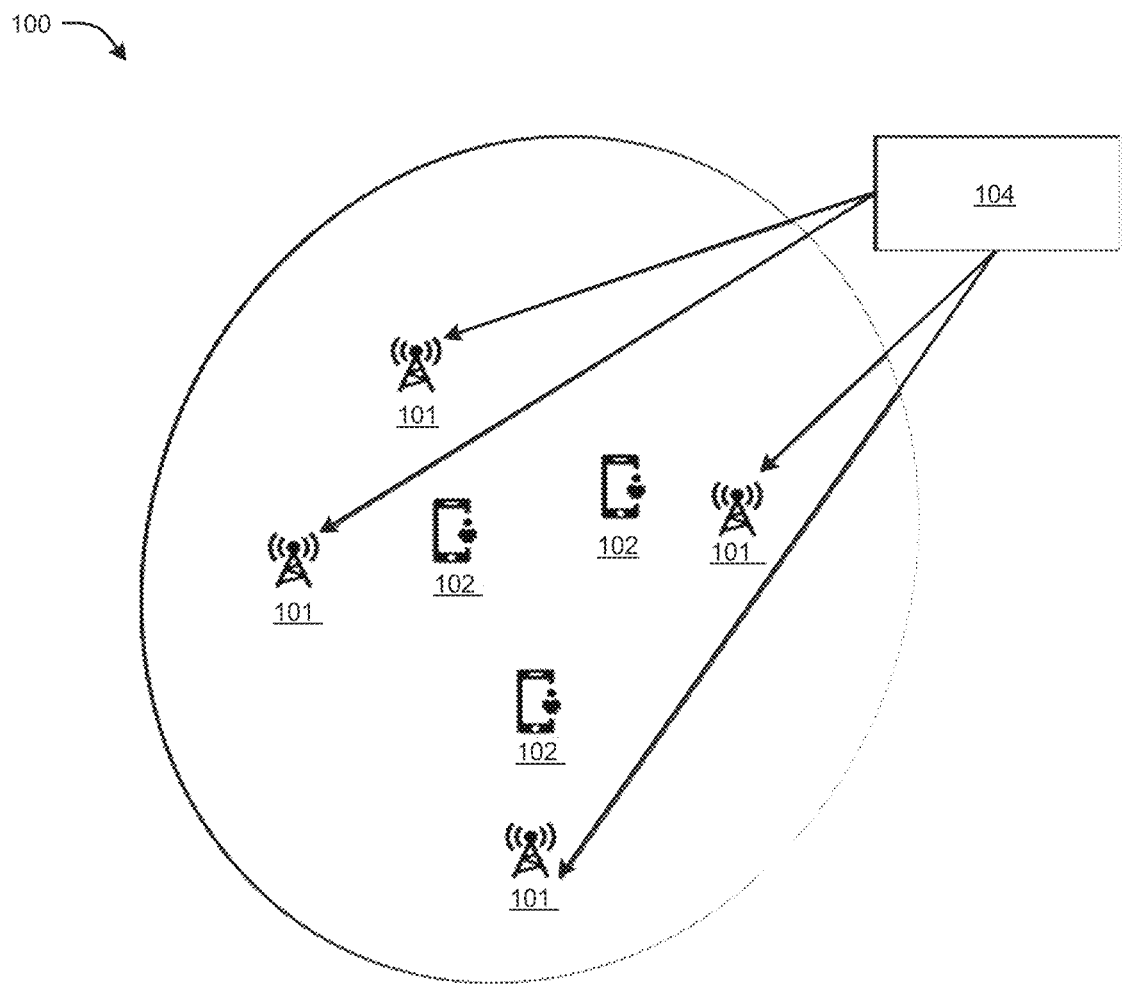
FIG. 1 illustrates an exemplary diagram representation (100) of an existing Telecom Area, in accordance with an embodiment of the present disclosure.

In the following description, for the purpose of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present invention are described below, as illustrated in various drawings in which like reference numerals refer to the same parts throughout the different drawings.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In an aspect, the present disclosure relates to a computation of a congestion score for an insight into a congestion profile of a telecom area under consideration. The computation would enable a telecom operator to provide solutions and preventive measures for the telecom area if the congestion score indicates a significant deterioration in a heterogeneous telecom network.

Figure 3:
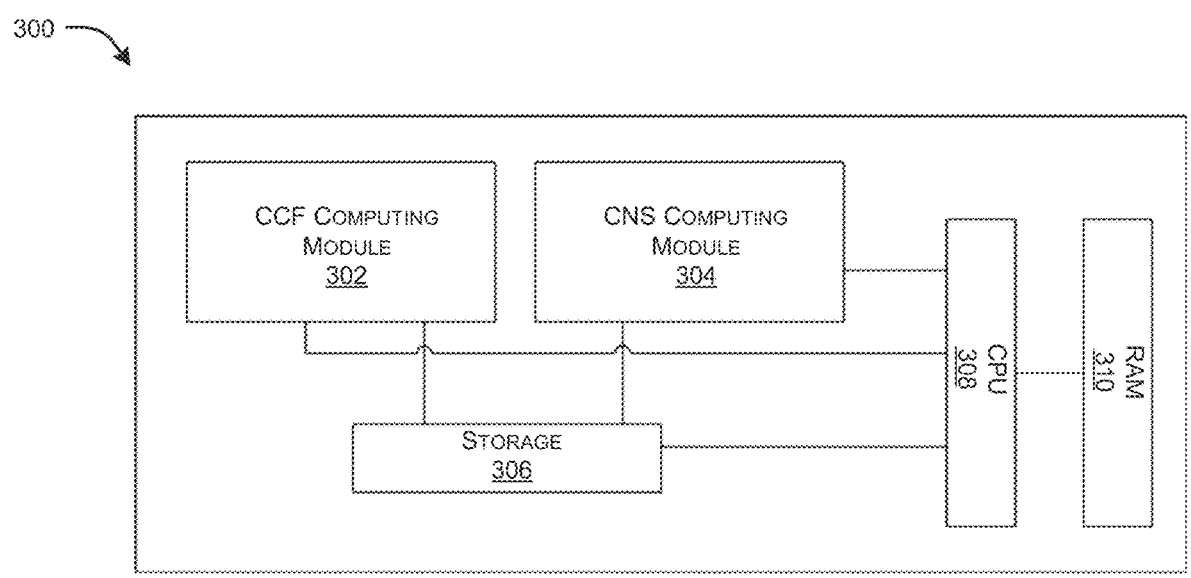
FIG. 3 illustrates an exemplary block diagram representation (300) of an Analytics Server to compute the User correlated Network Scores of Cells, in accordance with an embodiment of the present disclosure.

FIG. 1 illustrates an exemplary diagram representation (100) of a telecom Area, in accordance with an embodiment of the present disclosure. As illustrated in the figure, (101) may represent either a macro cell or a small cell operating in the telecom area. The macro cell or the small cell (101) may provide a wireless service to a mobile user (102) present in the telecom area. Further, the macro cell or the small cell (101) operating in the telecom area may be connected to a centralized entity (104), also known as a storage module (303), as depicted in FIG. 3. The centralized entity (104) or the storage module (303) may capture a call record whenever the mobile user (102) initiates a voice or data session with the telecom network by latching on to the macro cell or the small cell (101) operating in the telecom area. The centralized entity (104) or the storage module (303) may also calculate a key network KPI pertaining to the macro cell or the small cell (101) operating in the telecom area.

Figure 2:
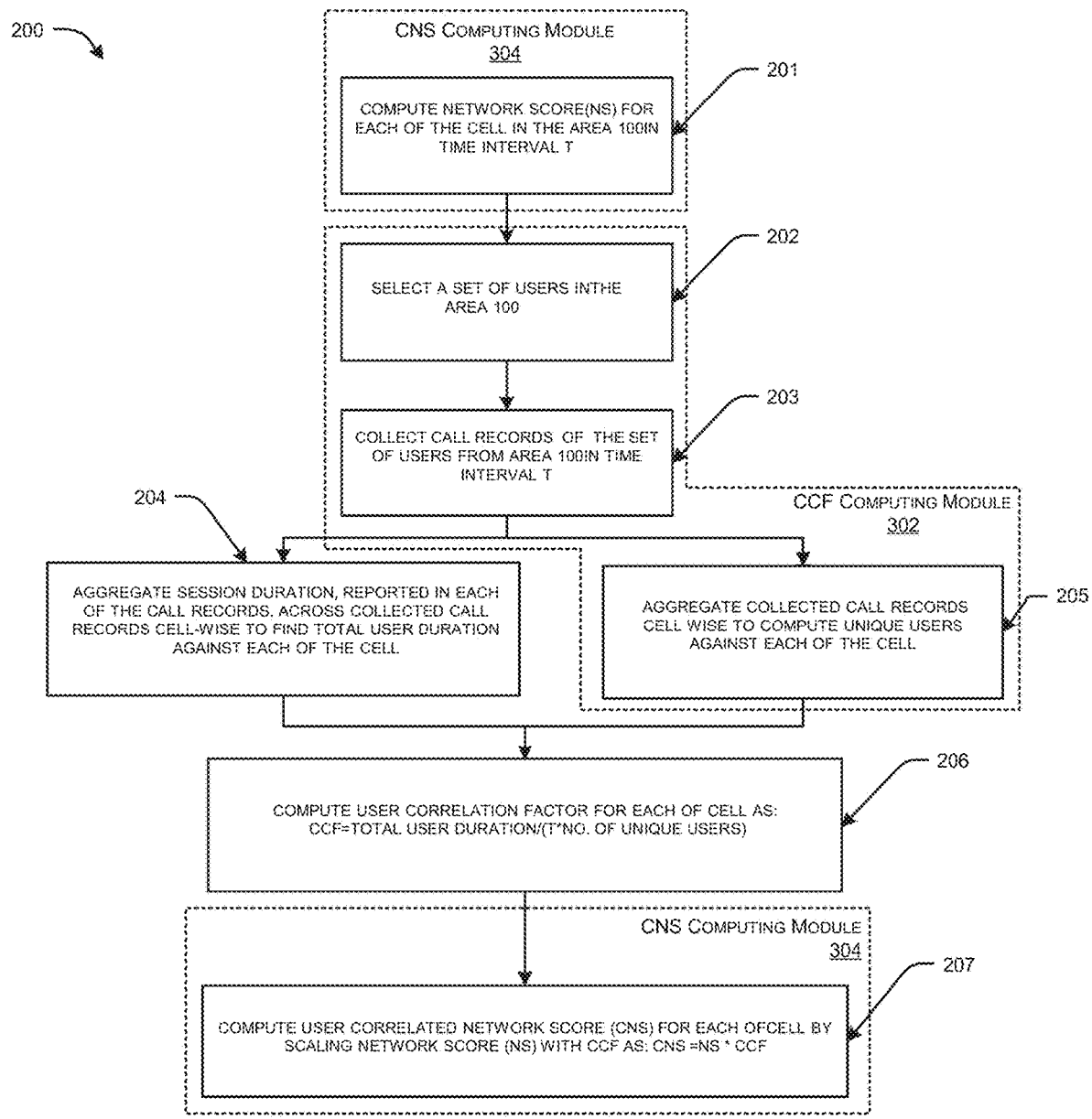
FIG. 2 illustrates an exemplary flow diagram (200) of a proposed User correlated Network Scores Calculation and Identification of users with a poor communication experience, in accordance with an embodiment of the present disclosure.

FIG. 2 illustrates an exemplary flow diagram (200) of a proposed User correlated Network Scores Calculation and Identification of users with a poor communication experience in the telecom area. A description of a process of calculating a user correlated network score of the macro cell or the small cell (101) operating in the telecom area for a time interval T is depicted in the figure. The process begins at 201, in a User correlated Network Score (CNS) computing module (304), where a Network score (NS) is computed for a time interval T for the macro cell or the small cell (101) operating in the telecom area. The network score for the macro cell or the small cell (101) operating in the telecom area may be based on one or more KPIs computed for the macro cell or the small cell (101) operating in the telecom area. Further, the network score may take either continuous or discrete values. After computing the network score for the macro cell or the small cell (101) operating in the telecom area, in 202, a selection of a set of users using a telecom service in the telecom area may be performed by a User Correlation Factor (CCF) computing module (302). The selection of the set of users may be based on a particular criterion. A criterion may be selecting users whose experience scores lie within the bottom 10 percentile values.

In 203, the call record of the set of users may be collected for the time interval T from the storage module (303) by the CCF computing module (302). In 204, a total user call duration corresponding to the macro cell or the small cell (101) may be calculated by aggregating the session duration reported in the collected call record cell-wise by the CCF computing module (302). In 205, unique users against the macro cell or the small cell (101) may be computed again by aggregating the call record cell-wise by the CCF computing module (302). In 206, a user correlation factor (CCF) for the macro cell or the small cell (101) may be calculated by dividing the total user call duration computed for the macro cell or the small cell (101) by the time interval T scaled with the unique users computed for the macro cell or the small cell (101) by the CCF computing module (302). In 207, the network score (NS) is appropriately scaled with the CCF to derive the user correlated network score (CCNS) of the macro cell or the small cell (101) for the time interval T by the CNS computing module (304).

In an embodiment, a method to compute the user correlated network score, CNS, for the macro cell or the small cell (101) operating in the telecom area in the time interval T is disclosed. The method may be performed by an analytics server or a server device (described and depicted in FIG. 3). In an embodiment, the method may begin with the step of ccomputing the network score NS for the macro cell or the small cell (101) operating in the telecom area in the time interval T. Next, the method computes, by a processor, a network score based on one or more Key Performance Indications (KPIs) of a macro cell or a small cell (101) operating in the telecom area for a time interval T.

Next, the method selects, by the processor, a group of mobile users (102) based on the computed network score. Next, the method collects, by the processor, a call record of the selected group of mobile users (102) from a storage module (303). Next, the method aggregates, by the processor, a session duration across the collected call record to computing, by the processor, a total user call duration for the macro cell or the small cell (101) operating in the telecom area for the time interval T. Next, the method computes, by the processor, a number of unique mobile users (102) latched on the macro cell or the small cell (101) operating in the telecom area by aggregating the collected call record cell-wise. Next, the method computes, by the processor, a user correlation factor of the macro cell or the small cell (101) operating in the telecom area for the time interval T based on the total user call duration for the macro cell or the small cell (101) operating in the telecom area for the time interval T and the number of unique mobile users (102) latched on the macro cell or the small cell (101) operating in the telecom area. Thereafter, the method ends with computing, by the processor, a user correlated network score for the macro cell or the small cell (101) operating in the telecom area based on the computed network score and the computed user correlation factor of the macro cell or the small cell (101) operating in the telecom area for the time interval T.

In an aspect, the call records for the mobile users (102) in the telecom area may represent either both the data and the voice sessions or either of them.

In another aspect, the call record may comprise mandatory parameters, such as a user IMSI identifier, a usage duration, a cell identifier, and a voice/data flag.

In another aspect, the network score NS may be computed for the macro cell or the small cell (101) operating in the telecom area for the time interval T based on the one or more network KPIs computed for the macro cell or the small cell (101) operating in the telecom area for the time interval T.

In another aspect, the KPIs such as an average throughput, a PRB Utilization, an interference ratio, a call drop rate, a mute call rate, a call setup success rate may be used to compute the network score for the macro cell or the small cell (101) operating in the telecom area for the time interval T.

In another aspect, the set of mobile users (102), in the telecom area, may be the bottom 'n' percentile users based on a user experience score computed for the mobile users (102) in the telecom area. The bottom 'n' percentile cells with respect to the user correlated network scores are selected as priority cells for corrective actions needed to improve the network score.

In another aspect, the network score NS may be computed as one of the limited discrete values based on the one or more network KPIs observed for the macro cell or the small cell (101) operating in the telecom area for the time interval T.

In another aspect, the user correlated network score CNS for a bigger time interval $T_{Large}$ may be calculated by breaking $T_{Large}$ into several smaller equal time intervals $T_{Small}$, computing user correlated network scores for each of the $T_{Small}$, averaging the computed scores for each of the $T_{Small}$ to find the user correlated network score CNS of the bigger time interval $T_{Large}$.

Another aspect wherein user correlated network score CNS shall predict and compute a realistic user score to get predictive insights into user profile of the area under consideration to provide solutions and preventive measures for the area in case the predictive score indicates significant deterioration.

In another embodiment, the method also could predict and compute a realistic user score would provide telecom operators the opportunity to get predictive insights into user profile of the area under consideration which would therefore enable operators to provision solutions and preventive measures for the area in case the predictive score indicates significant deterioration.

FIG. 3 illustrates an exemplary block diagram representation (300) of an Analytics Server to compute the User correlated Network Scores of the macro cell or the small cell (101) operating in the telecom area for the time interval T, in accordance with an embodiment of the present disclosure.

The storage module (303) of the Analytics Server may store the call record of the selected set of mobile users (102) by using telecom services in the telecom area during the time interval T. The storage module (303) may also store a set of network KPIs against the macro cell or the small cell (101) operating in the telecom area for the time interval T. The user correlation factor (CCF) computing module (301) of the Analytics Server may fetch the call record of the selected mobile users (102) from the storage module (303). Further, the user correlation factor (CCF) computing module (301) may calculate the CCF the macro cell or the small cell (101) operating in the telecom area for the time interval T. Further, the computed CCF for the macro cell or the small cell (101) operating in the telecom area for the time interval T may be stored in the storage module (303). The User correlated Network Score (CNS) computing module (302) may first calculate the Network Score (NS) for the macro cell or the small cell (101) operating in the telecom area for the time interval T by fetching the required KPIs from the storage module (303). Further, the User correlated Network Score (CNS) computing module (302) may fetch the CCF for the macro cell or the small cell (101) operating in the telecom area for the time interval T from the storage module (303). Thereafter, the User correlated Network Score (CNS) computing module (302) may scale the respective NS macro cell or the small cell (101) operating in the telecom area for the time interval T with the corresponding CCF macro cell or the small cell (101) operating in the telecom area for the time interval T to obtain the user correlated network score (CNS) of the macro cell or the small cell (101) operating in the telecom area for the time interval T.

The storage module (303) may be used by the user correlation factor (CCF) computing module (301) and the User correlated Network Score (CNS) computing module (302) to store temporary information or results. A CPU (304) and a RAM (305) may respectively be accessed by all modules for their respective computing needs.

Figure 4:
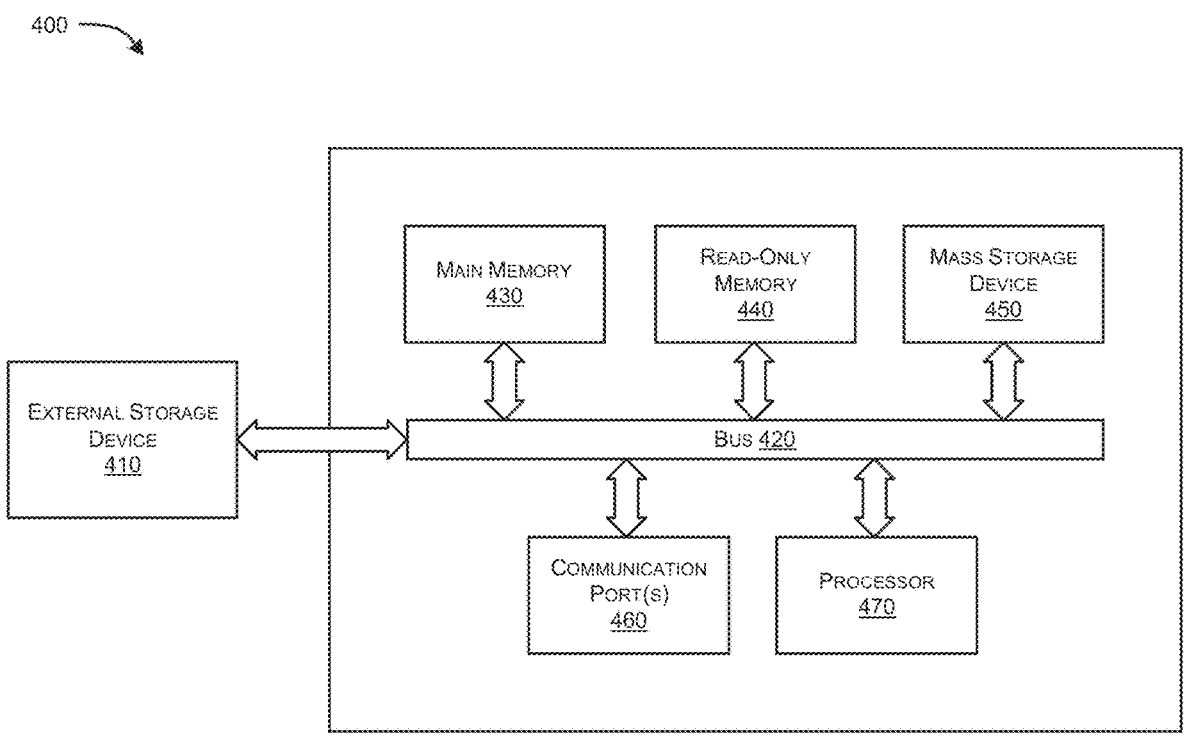
FIG. 4 illustrates an exemplary hardware representation diagram (400) in which or with which embodiments of the Analytics Server to compute the User correlated Network Scores of Cells (300) can be utilized, in accordance with embodiments of the present disclosure.

FIG. 4 illustrates an exemplary hardware representation diagram (400) in which or with which embodiments of the Analytics server (300) can be utilized in accordance with embodiments of the present disclosure. As shown in FIG. 4, the computer system (402) can include an external storage device (410), a bus (420), a main memory (430), a read-only memory (440), a mass storage device (450), a communication port (460), and a processor (470). A person skilled in the art will appreciate that the computer system may include more than one processor and communication ports. Examples of processor (470) may include, but are not limited to, an Intel® Itanium® or Itanium 2 processor(s), AMD® Opteron® or Athlon MP® processor(s), Motorola® lines of processors, FortiSOC™ system on chip processors, or other future processors. The processor (1330) may include various modules associated with embodiments of the present disclosure. The communication port (460) can be any RS-232 port for use with a modem-based dialup connection, a 10/100 Ethernet port, a Gigabit, or 10 Gigabit port using copper or fiber, a serial port, a parallel port, or other existing or future ports. The communication port (460) may be chosen depending on a network, such as a Local Area Network (LAN), a Wide Area Network (WAN), or any network to which the computer system (402) connects. The memory (430) can be Random Access Memory (RAM), or any other dynamic storage device commonly known in the art. The Read-only memory (440) can be any static storage device(s) e.g., but not limited to, a Programmable Read Only Memory (PROM) chip for storing static information e.g., start-up or BIOS instructions for the processor (470). The mass storage (450) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

The bus (420) communicatively couples the processor(s) (470) with the other memory, storage, and communication blocks. The bus (420) can be, e.g., a Peripheral Component Interconnect (PCI)/PCI Extended (PCI-X) bus, Small Computer System Interface (SCSI), USB, or the like, for connecting expansion cards, drives, and other subsystems as well as other buses, such a front side bus (FSB), which connects the processor (470) to the system (402).

Optionally, operator and administrative interfaces, e.g., a display, keyboard, and a cursor control device, may also be coupled to the bus (1320) to support direct operator interaction with a computer system. Other operator and administrative interfaces can be provided through network connections connected through communication port 1360. The external storage device (1310) can be any kind of external hard drives, floppy drives, IOMEGA® Zip Drives, Compact Disc—Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure While considerable emphasis has been placed herein on the disclosed embodiments, it will be appreciated that many embodiments can be made and that many changes can be made to the embodiments without departing from the principles of the present invention. These and other changes in the embodiments of the present invention will be apparent to those skilled in the art, whereby it is to be understood that the foregoing descriptive matter to be implemented is illustrative and non-limiting.

Key Advantages

One of the primary advantages is that this invention helps telecom operators to compute User correlated Network Scores of a geographical area being covered by the telecom service.

Another advantage of this invention is it provides a solution for computing a User correlated Network Scores of an area that may help operators to plan additional telecom capacity for the area thereby addressing improving the overall telecom experience of the users operating in the area.

Another advantage of this invention is it provides a solution to help operators find the root cause of a user complaint raised by a user operating in a confined area.

Another advantage of this invention is it provides a solution to help telecom operators to build the time-based User correlated Network profile of a telecom area.

Another advantage of this invention is it provides a solution to help telecom operators to compute a realistic user score would provide telecom operators the opportunity to get insights into the mobile user (102) profile of the area under consideration which would therefore enable operators to provide solutions and preventive measures for the area in case the score indicates significant deterioration.

Reservation of Rights

A portion of the disclosure of this patent document contains material, which is subject to intellectual property rights such as but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The present disclosure may pertain to 3GPP specifications such as for example 3GPP TS 29.198-04-5, version 9.0.0, Release 9.

We claim:

1. A system for computing a user correlated network score in a telecom area, the system comprising:
   a processor;
   a memory coupled to the processor, wherein the memory comprises processor-executable instructions, which on execution, causes the processor to:
      compute a network score based on one or more Key Performance Indications (KPIs) of a macro cell or a small cell operating in the telecom area for a time interval T;
      select a group of users based on the computed network score;
      collect a call record of the selected group of users from a storage module;
      aggregate a session duration across the collected call record to compute a total user call duration for the macro cell or the small cell operating in the telecom area for the time interval T;
      compute a number of unique users latched on the macro cell or the small cell operating in the telecom area by aggregating the collected call record cell-wise;
      compute a user correlation factor of the macro cell or the small cell operating in the telecom area for the time interval T by dividing the total user call duration computed for the macro cell or the small cell by the time interval T scaled with the number of unique users latched on the macro cell or the small cell operating in the telecom area; and
      compute a user correlated network score for the macro cell or the small cell operating in the telecom area based on the computed network score and the computed user correlation factor of the macro cell or the small cell operating in the telecom area for the time interval T.

2. The system as claimed in claim 1, wherein the network score of the macro cell or the small cell operating in the telecom area for the time interval T is computed based on the one or more KPIs that comprise an average throughput, a Physical Resource Block (PRB) utilization, interference ratio, a call drop rate, a mute call rate, and a call setup success rate.

3. The system as claimed in claim 1, wherein the selected group of users have the network score of a last "n" percentile network score.

4. The system as claimed in claim 1, wherein the call record of the selected group of users from the storage module is captured when a user initiates a voice or a data session with a telecom network by latching on to the macro cell or the small cell operating in the telecom area.

5. The system as claimed in claim 1, wherein the call record of the selected group of users from the storage module comprises parameters such as a user IMSI identifier, a usage duration, a cell identifier, and a voice/data flag.

6. The system as claimed in claim 1, wherein the user correlation factor of the macro or small cell operating in the telecom area for the time interval T is stored in the storage module.

7. The system as claimed in claim 1, wherein the user correlated network score is calculated by scaling the computed network score with the computed user correlation factor of the macro cell or the small cell operating in the telecom area for the time interval T.

8. The system as claimed in claim 1, wherein the user correlated network score comprises a realistic user score that provides a predictive insight into a mobile user profile of the telecom area.

9. The system as claimed in claim 1, wherein the user correlated network score for a bigger time interval $T_{Large}$ is calculated by dividing a bigger time interval $T_{Large}$ into a plurality of smaller and equal time intervals $T_{small}$ and computing the user correlated network score for a plurality of smaller and equal time intervals $T_{small}$ and averaging the computed correlated network scores for a plurality of smaller and equal time intervals $T_{small}$ to compute the user correlated network score for a bigger time interval $T_{Large}$.

10. A method for computing a user correlated network score in a telecom area, the method comprising:
   computing, by a processor, a network score based on one or more Key Performance Indications (KPIs) of a macro cell or a small cell operating in the telecom area for a time interval T;
   selecting, by the processor, a group of users based on the computed network score;
   collecting, by the processor, a call record of the selected group of users from a storage module;
   aggregating, by the processor, a session duration across the collected call record to compute a total user call duration for the macro cell or the small cell operating in the telecom area for the time interval T;
   computing, by the processor, a total user call duration for the macro cell or the small cell operating in the telecom area for the time interval T;
   computing, by the processor, a number of unique users latched on the macro cell or the small cell operating in the telecom area by aggregating the collected call record cell-wise;
   computing, by the processor, a user correlation factor of the macro cell or the small cell operating in the telecom area for the time interval T by dividing the total user call duration computed for the macro cell or the small cell by the time interval T scaled with the number of unique users latched on the macro cell or the small cell operating in the telecom area; and
   computing, by the processor, a user correlated network score for the macro cell or the small cell operating in the telecom area based on the computed network score and the computed user correlation factor of the macro cell or the small cell operating in the telecom area for the time interval T.

11. The method as claimed in claim 10, wherein the network score of the macro cell or the small cell operating in the telecom area for the time interval T is computed based on the one or more KPIs that comprise an average throughput, a Physical Resource Block (PRB) utilization, interference ratio, a call drop rate, a mute call rate, and a call setup success rate.

12. The method as claimed in claim 10, wherein the selected group of users have the network score of a last "n" percentile network score.

13. The method as claimed in claim 10, wherein the call record of the selected group of users from the storage module is captured when a user initiates a voice or a data session with a telecom network by latching on to the macro cell or the small cell operating in the telecom area.

14. The method as claimed in claim 10, wherein the call record of the selected group of users from the storage module comprises parameters such as a user IMSI identifier, a usage duration, a cell identifier, and a voice/data flag.

15. The method as claimed in claim 10, wherein the user correlation factor of the macro or small cell operating in the telecom area for the time interval T is stored in the storage module.

16. The method as claimed in claim 10, wherein the user correlated network score is calculated by scaling the computed network score with the computed user correlation factor of the macro cell or the small cell operating in the telecom area for the time interval T.

17. The method as claimed in claim 10, wherein the user correlated network score comprises a realistic user score that provides a predictive insight into a user profile of the telecom area.

18. The method as claimed in claim 10, wherein the user correlated network score for a bigger time interval $T_{Large}$ is calculated by dividing a bigger time interval $T_{Large}$ into a plurality of smaller and equal time intervals $T_{small}$ and computing the user correlated network score for a plurality of smaller and equal time intervals $T_{small}$ and averaging the computed correlated network scores for a plurality of smaller and equal time intervals $T_{small}$ to compute the user correlated network score for a bigger time interval $T_{Large}$.

* * * * *